United States Patent
Yamaguchi et al.

(10) Patent No.: US 10,626,926 B2
(45) Date of Patent: Apr. 21, 2020

(54) POWER TRANSMISSION APPARATUS AND LUBRICATING STRUCTURE OF POWER TRANSMISSION APPARATUS

(71) Applicant: Honda Motor Co., Ltd., Tokyo (JP)

(72) Inventors: Nobutaka Yamaguchi, Saitama (JP); Sayako Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 15/867,705

(22) Filed: Jan. 11, 2018

(65) Prior Publication Data

US 2018/0238399 A1 Aug. 23, 2018

(30) Foreign Application Priority Data

Feb. 23, 2017 (JP) ................................ 2017-032424

(51) Int. Cl.
*F16D 13/74* (2006.01)
*F16D 13/52* (2006.01)
(Continued)

(52) U.S. Cl.
CPC .............. *F16D 13/74* (2013.01); *B60K 17/02* (2013.01); *F16D 13/52* (2013.01);
(Continued)

(58) Field of Classification Search
CPC ...... F16D 13/74; F16D 13/52; F16D 25/0638; F16D 25/123; F16H 57/0424;
(Continued)

(56) References Cited

U.S. PATENT DOCUMENTS 4,958,712 A * 9/1990 Suganuma ............. F16D 13/52
192/113.36
6,401,896 B1 6/2002 Schnepf
(Continued)

FOREIGN PATENT DOCUMENTS

CN 101251159 8/2008
CN 105465213 4/2016
(Continued)

OTHER PUBLICATIONS

Office Action of China Counterpart Application, with English translation thereof, dated Mar. 29, 2019, pp. 1-12.
(Continued)

*Primary Examiner* — Tinh Dang
(74) *Attorney, Agent, or Firm* — JCIPRNET

(57) ABSTRACT

The lubricating structure includes a rotary shaft, a power transmission apparatus having a power transmission element disposed on an outer circumference of the rotary shaft and formed by alternately stacking frictional members, and a flow channel guides a lubricating liquid to the power transmission element. The power transmission element includes an inner circumferential cylindrical section rotated integrally with the rotary shaft, an outer circumferential cylindrical section rotated integrally with the frictional member, and a disk section configured to connect the inner circumferential cylindrical section and the outer circumferential cylindrical section. Inner-diameter-side through-holes through which a lubricating liquid passes on an inner diameter side of the disk section and outer-diameter-side through-holes through which a lubricating liquid passes on an outer diameter side of the disk section are formed in the disk section, and the inner-diameter-side through-holes and the outer-diameter-side through-holes are alternately disposed in a circumferential direction of the disk section.

8 Claims, 3 Drawing Sheets

(51) Int. Cl.
- *F16D 25/12* (2006.01)
- *F16H 57/04* (2010.01)
- *F16H 48/19* (2012.01)
- *B60K 17/02* (2006.01)
- *F16D 25/0638* (2006.01)
- *F16D 25/10* (2006.01)

(52) U.S. Cl.
CPC ......... *F16D 25/0638* (2013.01); *F16D 25/10* (2013.01); *F16D 25/123* (2013.01); *F16H 57/0424* (2013.01); *F16H 57/0427* (2013.01); *F16H 57/0473* (2013.01); *B60Y 2306/03* (2013.01); *B60Y 2400/4244* (2013.01); *F16H 48/19* (2013.01); *F16H 57/0471* (2013.01)

(58) Field of Classification Search
CPC .. F16H 57/0427; F16H 57/0473; F16H 48/19; F16H 57/0471; B60Y 2306/03; B60Y 2400/4244
See application file for complete search history.

(56) References Cited

U.S. PATENT DOCUMENTS 6,622,839 B2 * 9/2003 Kundermann ...... F16D 25/0638
192/207
9,709,133 B2 * 7/2017 Otsuki ................ F16H 57/0426

FOREIGN PATENT DOCUMENTS

| JP | 2003-240017 | | 8/2003 |
| JP | 2004197777 | | 7/2004 |
| JP | 2004197777 A | * | 7/2004 |
| TW | 200303399 | | 9/2003 |

OTHER PUBLICATIONS

"Office Action of Japan Counterpart Application," with machine English translation thereof, dated Aug. 28, 2018, p. 1-p. 8.
"Office Action of China Counterpart Application," with English translation thereof, dated Sep. 19, 2019, p. 1-p. 13.

* cited by examiner

POWER TRANSMISSION APPARATUS AND LUBRICATING STRUCTURE OF POWER TRANSMISSION APPARATUS

CROSS-REFERENCE TO RELATED APPLICATION

This application claims the priority benefit of Japan application serial no. 2017-032424, filed on Feb. 23, 2017. The entirety of the above-mentioned patent application is hereby incorporated by reference herein and made a part of this specification.

BACKGROUND OF THE INVENTION

Field of the Invention

The invention relates to a power transmission apparatus including a power transmission element such as a clutch, a brake, or the like, and a lubricating structure configured to effectively lubricate members disposed in the power transmission apparatus.

Description of Related Art

For example, a frictional engaging apparatus such as a clutch or the like installed on the side of an outer diameter of a rotary shaft as shown in Patent Literature 1 is provided as a power transmission apparatus of an automobile. The power transmission apparatus disclosed in Patent Literature 1 includes a clutch configured to switch presence/absence of rotation transmission between two rotary shafts coaxially disposed in parallel. The clutch includes a clutch housing fixed to one of the rotary shafts, a clutch hub fixed to the other rotary shaft on an inner circumferential surface of the clutch housing, and a frictional engaging section in which a plurality of frictional members fixed to the clutch housing and a plurality of frictional members fixed to the clutch hub are alternately stacked in the clutch housing in an axial direction.

Further a clutch piston configured to press the frictional engaging section in a stacking direction of the frictional members, a piston housing configured to accommodate the clutch piston, and a piston chamber defined in the piston housing between the piston housing and the clutch piston and configured to generate a hydraulic pressure to drive the clutch piston toward the frictional engaging section are installed in the clutch. Accordingly, the clutch piston is driven by the hydraulic pressure generated in the piston chamber, the frictional engaging section is pressed and engaged by the clutch piston, and thus the clutch is fastened.

Here, a plurality of through-holes are formed in a flange of the clutch hub in Patent Literature 1. As the through-holes are provided, lubricating oil supplied to the clutch hub passes through the plurality of through-holes to be supplied to a side opposite to the clutch hub in the axial direction. Accordingly, lubrication of the clutch hub and peripheral members thereof is performed.

However, like Patent Literature 1, if a portion close to an outer diameter of the flange and the plurality of through-holes are formed to be arranged on a concentric circle of the flange, when the lubricating oil is guided to the side of the inner diameter of the flange, the lubricating oil may be blocked by the flange and smooth circulation of the lubricating oil may not be achieved.

[Patent Document 1] Japanese Patent Application Paid-Open No. 2003-240017

SUMMARY OF THE INVENTION

A lubricating structure of a power transmission apparatus according to one or some embodiments of the invention includes a rotary shaft (for example, an output shaft (6L, 6R) in the embodiment), a power transmission apparatus (for example, a clutch apparatus (5L, 5R) in the embodiment) having a power transmission element (for example, a clutch hub (52) in the embodiment) disposed on an outer circumference of the rotary shaft and formed by alternately stacking a plurality of frictional members (for example, friction plates (54) in the embodiment) in an axial direction, and a flow channel (for example, a lubricating oil passage (60) in the embodiment) configured to guide a lubricating liquid that performs lubrication of the power transmission apparatus to the power transmission element, wherein the power transmission element (52) includes an inner circumferential cylindrical section (52a) rotated integrally with the rotary shaft (6L, 6R), an outer circumferential cylindrical section (52b) rotated integrally with the frictional member (54), and a disk section (for example, a flange (52c) in the embodiment) configured to connect the inner circumferential cylindrical section and the outer circumferential cylindrical section in a radial direction, a lubricating liquid discharged from the flow channel is guided to the disk section, inner-diameter-side through-holes (H1) through which a lubricating liquid passes on an inner diameter side of the disk section and outer-diameter-side through-holes (H2) through which a lubricating liquid passes on an outer diameter side of the disk section are formed in the disk section, and the inner-diameter-side through-holes and the outer-diameter-side through-holes are alternately disposed in a circumferential direction of the disk section.

In addition, a power transmission apparatus according to one or some embodiments of the invention is a power transmission apparatus (for example, a clutch apparatus (5L, 5R) in the embodiment) including a rotary shaft (for example, an output shaft (6L, 6R) in the embodiment) and a power transmission element (for example, a clutch hub (52) in the embodiment) disposed on an outer circumference of the rotary shaft and formed by alternately stacking a plurality of frictional members (for example, friction plates (54) in the embodiment) in an axial direction, wherein the power transmission element includes an inner circumferential cylindrical section (52a) rotated integrally with the rotary shaft, an outer circumferential cylindrical section (52b) rotated integrally with the frictional member (54), and a disk section (for example, a flange (52c) in the embodiment) configured to connect the inner circumferential cylindrical section and the outer circumferential cylindrical section in a radial direction, inner-diameter-side through-holes (H1) through which a lubricating liquid passes on an inner diameter side of the disk section and outer-diameter-side through-holes (H2) through which a lubricating liquid passes on an outer diameter side of the disk section are formed in the disk section, and the inner-diameter-side through-holes and the outer-diameter-side through-holes are alternately disposed in a circumferential direction of the disk section.

Further, reference numerals in the parentheses show the reference numerals of the corresponding components of the following embodiment as an exemplary embodiment of the invention.

DESCRIPTION OF THE EMBODIMENTS

Figure 1:
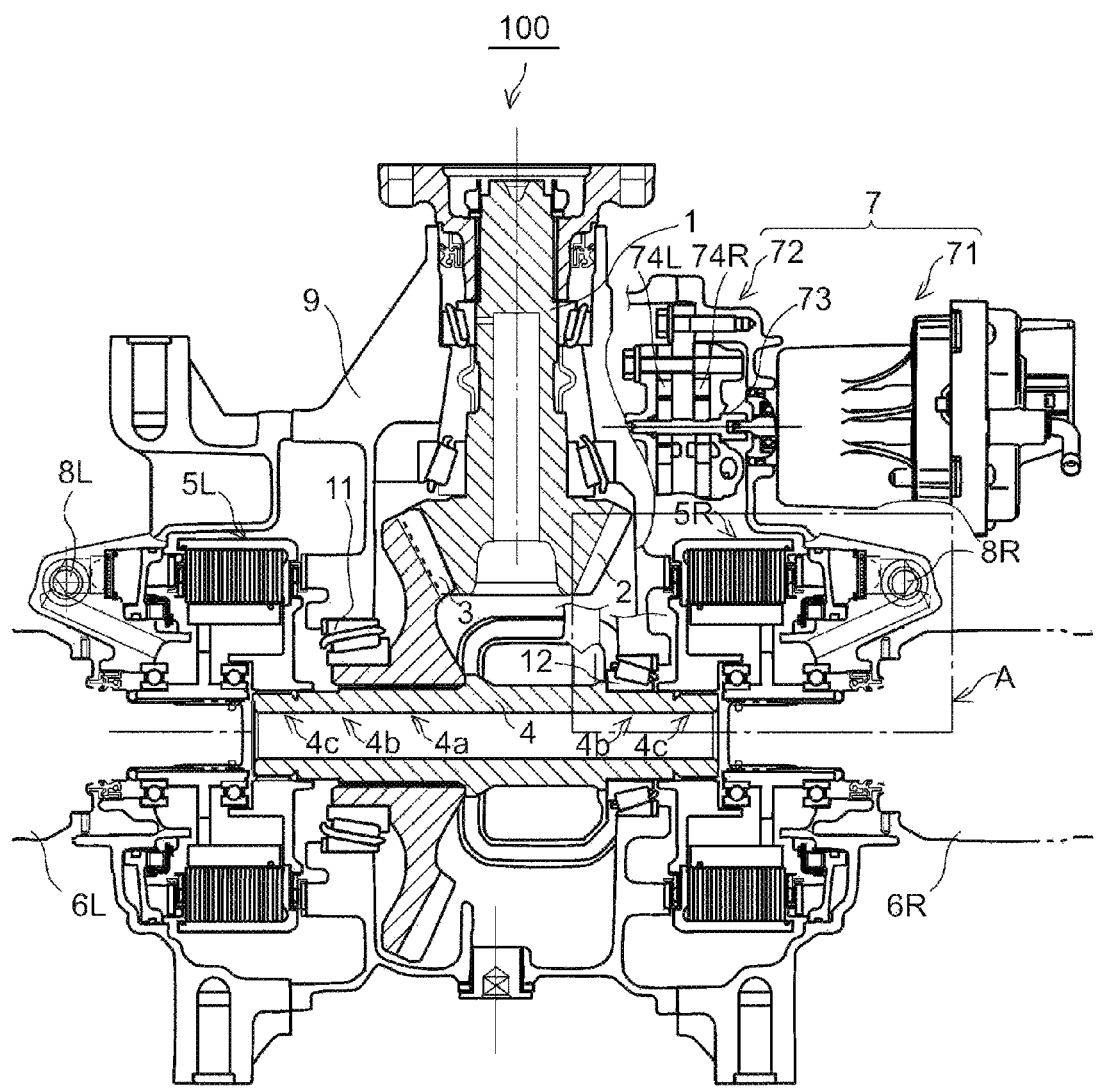
FIG. 1 is a view for describing a cross section of a major part of a clutch apparatus of the embodiment.

Some embodiments of the invention provide a power transmission apparatus and a lubricating structure thereof having a structure configured to suppress interference with circulation of a lubricating liquid (for example, oil in the embodiment) supplied to a power transmission element and more smoothly guide the lubricating liquid.

According to one or some embodiments of the invention, as the inner-diameter-side through-holes are formed on the inner diameter side of the disk section and the outer-diameter-side through-holes are formed on the outer diameter side of the disk section, the lubricating liquid guided to the inner diameter side of the disk section passes through the inner-diameter-side through-holes to move to a side opposite to the disk section. In addition, since the lubricating liquid hitting the disk section moves to the outer diameter side due to a centrifugal force, the lubricating liquid moves to the side opposite to the disk section through the outer-diameter-side through-holes. Accordingly, regardless of which portion of the disk section the lubricating liquid is guided to, the lubricating liquid can easily pass through the disk section. In addition, as the inner-diameter-side through-holes and the outer-diameter-side through-holes are alternately disposed in the circumferential direction of the disk section, in comparison with the case in which the through-holes are concentrically arranged on the disk section, the lubricating liquid can be evenly diffused to the inner diameter side and the outer diameter side.

In addition, in the lubricating structure of the above-mentioned power transmission apparatus, an outflow port (60a) of the flow channel faces the inner-diameter-side through-holes. In this case, first, the lubricating liquid discharged from the flow channel is guided to the inner diameter side. Then, the lubricating liquid can easily pass through the inner-diameter-side through-holes. Then, the lubricating liquid hitting the disk section moves to the outer diameter side where the outer-diameter-side through-holes are located due to the centrifugal force without passing through the inner-diameter-side through-holes. Accordingly, an amount of lubricating liquid can be evenly distributed to the inner-diameter-side through-holes and the outer-diameter-side through-holes.

In addition, in the lubricating structure of the above-mentioned power transmission apparatus, the outermost ends (H1a) of the inner-diameter-side through-holes in the radial direction are disposed further outside in the radial direction than a position at which a virtual line (L1) on which the flow channel extends from the outflow port and the disk section cross each other.

In this way, as the outermost ends of the inner-diameter-side through-holes in the radial direction are disposed further outside in the radial direction than a position at which the line extending from the outflow port along the flow channel and the disk section cross each other, according to a state in which the inner-diameter-side through-holes face the outflow port, a route of the lubricating liquid discharged from the outflow port of the flow channel is not blocked. For this reason, the lubricating liquid can securely pass through the inner-diameter-side through-holes.

In addition, in the lubricating structure of the above-mentioned power transmission apparatus, a total area (S1) of the inner-diameter-side through-holes is larger than a total area (S2) of the outer-diameter-side through-holes. In this way, as the total area of the inner-diameter-side through-holes is larger than the total area of the outer-diameter-side through-holes, a throughput of the lubricating liquid in the inner-diameter-side through-holes can be larger than a throughput of the lubricating liquid in the outer-diameter-side through-holes. Accordingly, the lubricating liquid discharged from the outflow port can be more largely guided to the side opposite to the disk section.

In addition, in the lubricating structure of the above-mentioned power transmission apparatus, the inner-diameter-side through-holes or the outer-diameter-side through-holes have rectangular shapes formed by sides in a radial direction and sides in a circumferential direction. In this way, when the through-holes are formed in rectangular shapes and have sides in the radial direction, the lubricating liquid flowing in the radial direction of the disk section due to the centrifugal force can easily pass through the through-holes.

In addition, in the above-mentioned power transmission apparatus, a flow channel configured to guide a lubricating liquid that performs lubrication of the power transmission apparatus to the disk section may be provided, and an outflow port of the flow channel may face the inner-diameter-side through-holes. In addition, the flow channel configured to guide a lubricating liquid that performs lubrication of the power transmission apparatus to the disk section may be provided, and the outermost ends of the inner-diameter-side through-holes in the radial direction may be disposed further outside in the radial direction than a position at which a virtual line on which the flow channel extends from the outflow port and the disk section cross each other.

In addition, in the above-mentioned power transmission apparatus, a total area (S1) of the inner-diameter-side through-holes may be larger than a total area (S2) of the outer-diameter-side through-holes. In addition, in the above-mentioned power transmission apparatus, the inner-diameter-side through-holes or the outer-diameter-side through-holes may have rectangular shapes formed by sides in a radial direction and sides in a circumferential direction.

Further, reference numerals in the parentheses show the reference numerals of the corresponding components of the following embodiment as an exemplary embodiment of the invention.

According to the power transmission apparatus and the lubricating structure thereof in accordance of one or some embodiments of the invention, disturbance of circulation of the lubricating liquid supplied to the power transmission element can be suppressed, and the lubricating liquid can be more smoothly guided.

Hereinafter, an embodiment of the invention will be described in detail with reference to the accompanying drawings. FIG. 1 is a view for describing a cross section of a major part of a clutch apparatus 5L, 5R of the embodiment. In the embodiment, a hydraulic pressure type driving force transmission apparatus will be exemplarily described as a driving force transmission apparatus 100 having the clutch apparatus 5L, 5R. The driving force transmission apparatus 100 is configured as a differential mechanism configured to distribute rotation of a driving shaft 1 to left and right driving wheels (not shown).

The driving force transmission apparatus 100 has the driving shaft 1 coupled to a propeller shaft (not shown). A driving force from a driving source (an engine), which is not shown, is transmitted to the driving shaft 1.

The driving force transmission apparatus 100 has a driving bevel gear 2 rotated integrally with the driving shaft 1, a driven bevel gear 3 meshed with the driving bevel gear 2, and a center shaft 4 disposed perpendicular to the driving shaft 1 and coupled to be rotated integrally with the driven bevel gear 3. In addition, left and right clutch apparatuses 5L and 5R disposed at left and right sides of the center shaft 4, and left and right output shafts 6L and 6R configured to transmit driving forces transmitted by the left and right clutch apparatuses 5L and 5R to left and right driving wheels (not shown) are provided. The center shaft 4 corresponds to "an input shaft" for the left and right clutch apparatuses 5L and 5R, and the left and right output shafts 6L and 6R correspond to "an output shaft" for the left and right clutch apparatuses 5L and 5R.

In addition, the driving force transmission apparatus 100 includes an electric oil pump 7 configured to supply oil to the left and right clutch apparatuses 5L and 5R, left and right pressure regulating valves 8L and 8R configured to regulate (decompress) a pressure of the oil discharged from the electric oil pump 7, and a housing 9 that is a housing configured to cover the entirety including the clutch apparatuses 5L and 5R.

The center shaft 4 has a large diameter section 4a of a center thereof, left and right medium diameter sections 4b of the large diameter section 4a, and small diameter sections 4c of left and right ends adjacent to the medium diameter sections 4b. The driven bevel gear 3 is fixed to the large diameter section 4a, and the center shaft 4 is rotated integrally as a whole. A plurality of spline teeth are formed on the small diameter sections 4c of left and right ends of the center shaft 4 in a circumferential direction and spline-coupled to be rotated integrally with power transmission elements of the left and right clutch apparatuses 5L and 5R.

The center shaft 4 is mounted in the housing 9 of a differential mechanism via taper bearings 11 and 12. The taper bearing 11 is fixed by an axial direction thereof being sandwiched between the housing 9 and the driven bevel gear 3. The taper bearing 12 is fixed by an axial direction (a longitudinal direction) thereof being sandwiched between the housing 9 and the center shaft 4.

The electric oil pump 7 includes a motor unit 71 configured to generate a rotating power and a pump unit 72 configured to suction the oil from an oil strainer using the rotating power to pump the oil to the left and right clutch apparatuses 5L and 5R, and the pump unit 72 forms a two-pump structure in which two left and right inscribed gear pumps 74L, 74R are serially connected to a pump shaft 73. Further, in the embodiment, for example, a left inscribed gear pump 74L pumps the oil to the left clutch apparatus 5L, and a right inscribed gear pump 74R pumps the oil to the right clutch apparatus 5R.

The left and right pressure regulating valves 8L and 8R are disposed substantially symmetrically next to the left and right clutch apparatuses 5L and 5R, respectively. The left and right pressure regulating valves 8L and 8R include linear solenoid valves (electromagnetic pressure regulating valves).

Figure 2:
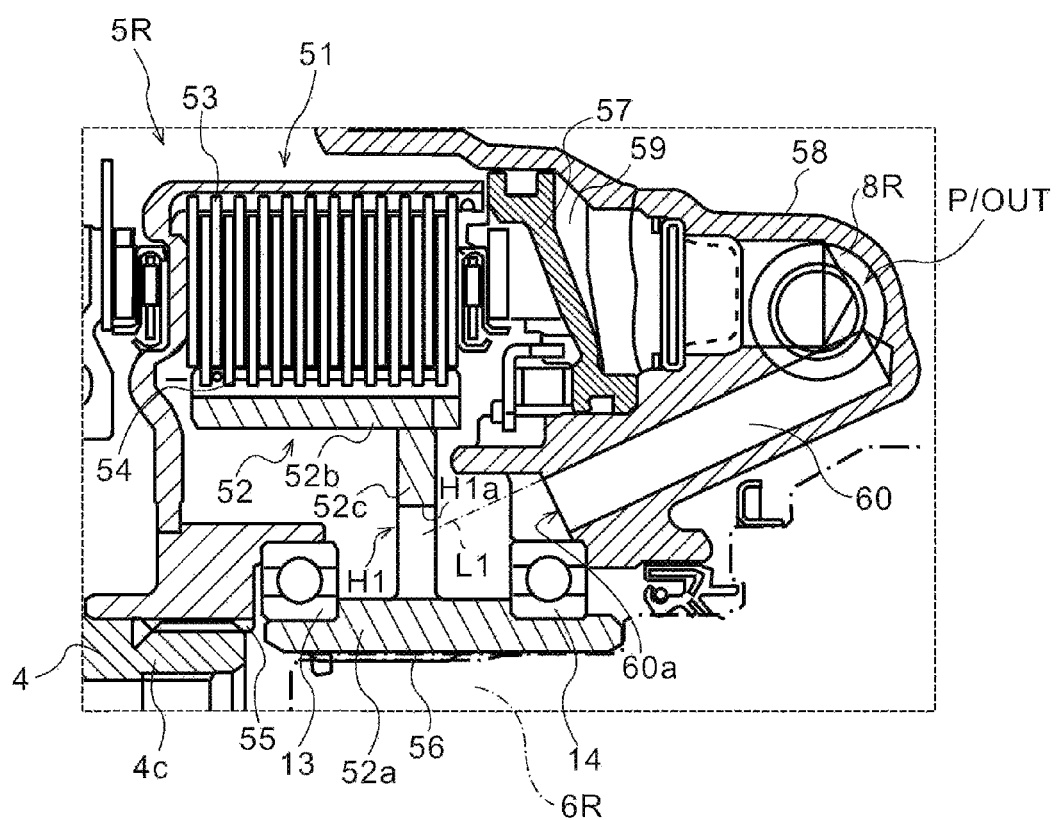
FIG. 2 is a view for describing a peripheral portion of a right clutch apparatus of the embodiment.

FIG. 2 is a view for describing a peripheral part of the right clutch apparatus 5R of the embodiment, showing an enlarged view of a portion A in FIG. 1. The left and right clutch apparatuses 5L and 5R include wet multi-plate clutches. Since the left and right clutch apparatuses 5L and 5R have the same configuration, here, only the clutch apparatus 5R will be described. In addition, for the same reason, subscripts L and R that mean "left" and "right" in the following description will be omitted unless the left and right sides should be discriminated.

As shown in FIG. 2, the clutch apparatus 5R has a clutch guide 51 that is an input-side rotary member rotated integrally with the center shaft 4, and a clutch hub 52 that is an output-side rotary member rotated integrally with an output shaft 6R. A plurality of separator plates 53 that are frictional members are arranged at predetermined intervals in the axial direction to be spline-coupled to an inner circumferential surface of the clutch guide 51. A plurality of friction plates 54 that are frictional members are arranged at predetermined intervals in the axial direction to be spline-coupled to an outer circumferential surface of the clutch hub 52. The separator plates 53 and the friction plates 54 are disposed to be alternately arranged in the axial direction to form a stacked body of the separator plates 53 and the friction plates 54.

A spline section 55 is formed close to a base of the clutch guide 51, and the spline section 55 is spline-coupled to the small diameter section 4c of a right end of the center shaft 4. Accordingly, the clutch guide 51 is rotated integrally with the center shaft 4. Meanwhile, a spline section 56 is formed close to a base of the clutch hub 52, and the spline section 56 is spline-coupled to the output shaft 6R. Accordingly, the clutch hub 52 is rotated integrally with the output shaft 6R.

The clutch guide 51 and the clutch hub 52 are mutually supported via a ball bearing 13 to be relatively rotatable. Meanwhile, the clutch hub 52 is relatively rotatably fixed to a case 58 via a ball bearing 14.

A stacked body (hereinafter referred to as "a frictional engaging section") of the separator plates 53 and the friction plates 54 is driven by a piston 57 in the axial direction (left in FIG. 2) when the clutch is fastened. The separator plates 53 and the friction plates 54 are frictionally engaged according to driving of the piston 57, and the clutch is fastened. The piston 57 is driven by a hydraulic pressure in a piston chamber 59 and controlled such that a clutch fastening amount required in the frictional engaging section is obtained.

In the embodiment, a lubricating oil passage 60 configured to directly guide the oil discharged from an outlet port P/OUT of a pressure regulating valve 8L, 8R into the clutch apparatus 5L, 5R is formed in the case 58. The oil flowing out of an outflow port 60a of the lubricating oil passage 60 of the pressure regulating valve 8L, 8R flows toward a flange 52c of the clutch hub 52 disposed on an extension line of the lubricating oil passage 60.

Figure 3:
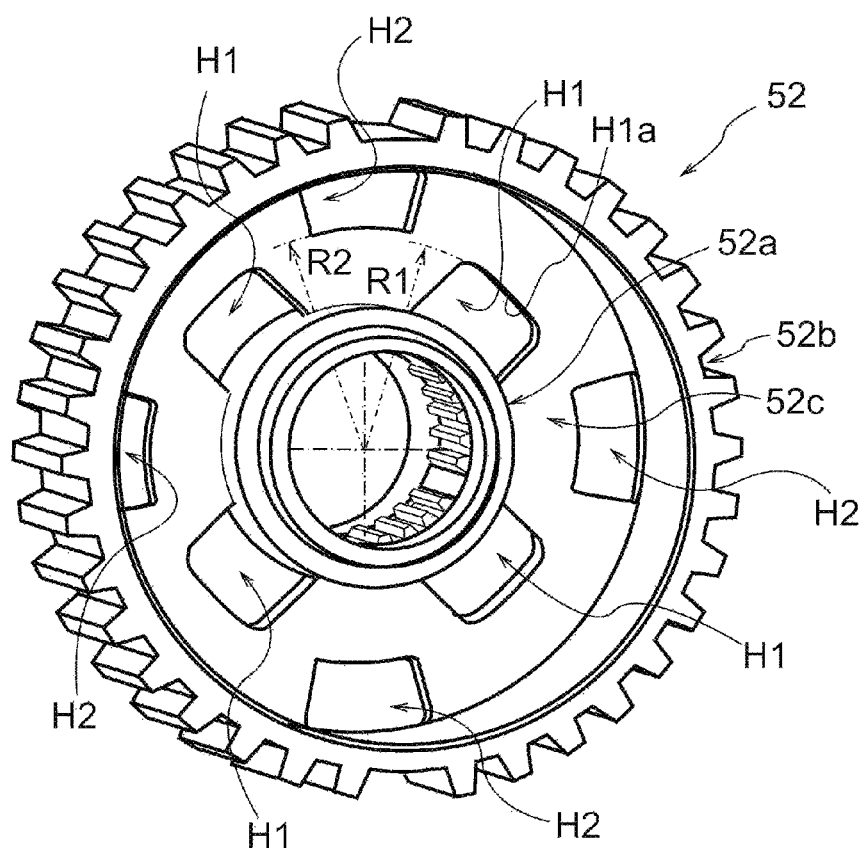
FIG. 3 is a perspective view for describing a configuration of a clutch hub of e embodiment.

FIG. 3 is a perspective view for describing a configuration of the clutch hub 52 of the embodiment. As shown in FIG. 3, an inner circumferential cylindrical section 52a spline-coupled to an output shaft 6L, 6R, an outer circumferential cylindrical section 52b spline-coupled to the friction plate 54, and the flange 52c configured to connect the inner circumferential cylindrical section 52a and the outer circumferential cylindrical section 52b in the radial direction are formed on the clutch hub 52.

Inner-diameter-side through-holes H1 and outer-diameter-side through-holes H2 that are a plurality of through-holes are formed in the flange 52c of the clutch hub 52, and the oil passes therethrough. In the embodiment, four inner-diameter-side through-holes H1 are formed in the flange 52c on the inner diameter side at equal intervals in the circumferential direction, and four outer-diameter-side through-holes H2 are formed in the flange 52c on the outer diameter side at equal intervals in the circumferential direction. Further, the number of through-holes is not limited to the configuration of the embodiment. However, a total area S1 of the four inner-diameter-side through-holes H1 is larger than a total area S2 of the four outer-diameter-side through-holes H2.

Shapes of both the inner-diameter-side through-holes H1 and the outer-diameter-side through-holes H2 are rectangular shapes formed by sides of the flange 52c in the radial direction and sides of the flange 52c in the circumferential direction. When the shapes of the through-holes are rectangular shapes, the oil flowing through the flange 52c in the radial direction can easily pass through the through-holes in comparison with the case of circular shapes.

The inner-diameter-side through-holes H1 and the outer-diameter-side through-holes H2 are alternately disposed in the circumferential direction of the flange 52c. That is, the inner-diameter-side through-holes H1 and the outer-diameter-side through-holes H2 are disposed in a so-called staggered form in the circumferential direction of the flange 52c. In the embodiment, the inner-diameter-side through-holes H1 that are adjacent to each other are formed at 90-degree angles about a rotation axis of the flange 52c. In addition, the outer-diameter-side through-holes H2 that are adjacent to each other are formed at 90-degree angles about the rotation axis of the flange 52c. The inner-diameter-side through-holes H1 and the outer-diameter-side through-holes H2 that are adjacent to each other are disposed at 45-degree angles about the rotation axis of the flange 52c. In this way, the inner-diameter-side through-holes H1 and the outer-diameter-side through-holes H2 are disposed at equiangular intervals in the circumferential direction.

The inner-diameter-side through-holes H1 are formed at positions at which the inner-diameter-side through-holes H1 face the outflow port 60a of the lubricating oil passage 60 (see FIG. 2). Outer diameter sections of the inner-diameter-side through-holes H1 have a distance R1 from a center of a rotation axis of the flange 52c that is substantially constant. Further, inner diameter sections of the outer-diameter-side through-holes H2 have a distance R2 from the center of the rotation axis of the flange 52c that is substantially constant.

The outermost ends H1a of the inner-diameter-side through-holes H1 in the radial direction are configured to have a size such that a flow of the oil discharged from the lubricating oil passage 60 is not interfered with. That is, in the clutch apparatus 5L, 5R, when a virtual line L1 (see FIG. 2) on which the lubricating oil passage 60 from the pressure regulating valve 8L, 8R extends from the outflow port 60a is drawn, the outermost ends H1a of the inner-diameter-side through-holes H1 in the radial direction are formed further outside in the radial direction than the position at which the virtual line L1 and the flange 52c cross each other.

In the embodiment, the distance R1 from the center of the rotation axis of the outer diameter sections of the inner-diameter-side through-holes H1 is smaller than the distance R2 from the center of the rotation axis of the inner diameter sections of the outer-diameter-side through-holes H2. According to the above-mentioned configuration, the inner-diameter-side through-holes H1 and the outer-diameter-side through-holes H2 do not overlap each other in the radial direction. Accordingly, a decrease in rigidity of the flange 52c can be suppressed.

As described above, according to the clutch apparatuses 5L and 5R of the embodiment and the lubricating structure thereof, the inner-diameter-side through-holes H1 are formed in the flange 52c on the inner diameter side and the oil passes therethrough, and the outer-diameter-side through-holes H2 are formed in the flange 52c on the outer diameter side and the oil passes therethrough. Then, the oil discharged from the lubricating oil passage 60 and guided to the inner diameter side of the flange 52c passes through the inner-diameter-side through-holes H1 to move to a side opposite to the flange 52c. In addition, since the oil hitting the flange 52c moves toward the outer diameter side due to a centrifugal force, the oil passes through the outer-diameter-side through-holes H2 to move to the side opposite to the flange 52c. Accordingly, regardless of which portion of the flange 52c the oil is guided to, the oil can easily pass through the flange 52c. In addition, as the inner-diameter-side through-holes H1 and the outer-diameter-side through-holes H2 are alternately disposed in the circumferential direction of the flange 52c, in comparison with the case in which the through-holes are arranged concentrically in the disk section, the oil can be evenly diffused to the inner diameter side and the outer diameter side.

In addition, in the embodiment, the outflow port 60a of the lubricating oil passage 60 faces the inner-diameter-side through-holes H1. In this case, first, the oil discharged from the lubricating oil passage 60 is guided to the inner diameter side. Then, the oil can easily pass through the inner-diameter-side through-holes H1. Then, the oil hitting the flange 52c moves toward the outer diameter side where the outer-diameter-side through-holes H2 are located due to the centrifugal force without passing through the inner-diameter-side through-holes H1. Accordingly, an amount of the oil can be evenly distributed to the inner-diameter-side through-holes H1 and the outer-diameter-side through-holes H2.

In addition, in the embodiment, the outermost ends H1a of the inner-diameter-side through-holes H1 in the radial direction are disposed further outside in the radial direction than a position at which the virtual line L1 on which the lubricating oil passage 60 extends from the outflow port 60a and the flange 52c cross each other. Accordingly, a route of the oil discharged from the outflow port 60a of the lubricating oil passage 60 is not blocked. For this reason, the oil can securely pass through the inner-diameter-side through-holes H1.

In addition, like the embodiment, as the total area S2 of the outer-diameter-side through-holes H2 is larger than the total area S1 of the inner-diameter-side through-holes H1, a throughput of the oil in the inner-diameter-side through-holes H1 can be larger than a throughput of the oil in the outer-diameter-side through-holes H2. Accordingly, the oil discharged from the outflow port 60a can be more largely guided to the side opposite to the flange 52c.

In addition, in the embodiment, the inner-diameter-side through-holes H1 and the outer-diameter-side through-holes H2 have rectangular shapes formed by the sides in the radial direction and the sides in the circumferential direction. In this way, when the through-holes are formed in rectangular shapes and have sides extending in the radial direction, the oil flowing in the radial direction of the flange 52c can easily pass through the through-holes due to the centrifugal force.

While an embodiment of the invention has been described above, the invention is not limited to the embodiment and various modifications may be made without departing from the technical spirit of the invention disclosed in the claims, description and drawings.

While the oil is commonly used in both of a piston driving hydraulic pressure and clutch lubrication in the embodiment, there is no limitation thereto. For example, piston driving is operated using an electromagnetic force or different liquids, and oil may be used only in clutch lubrication.

What is claimed is:

1. A lubricating structure of a power transmission apparatus comprising:
a rotary shaft;
the power transmission apparatus having a power transmission element disposed on an outer circumference of the rotary shaft and formed by alternately stacking a plurality of frictional members in an axial direction; and
a flow channel configured to guide a lubricating liquid that performs lubrication of the power transmission apparatus to the power transmission element,
wherein the power transmission element comprises an inner circumferential cylindrical section rotated integrally with the rotary shaft, an outer circumferential cylindrical section rotated integrally with the plurality of frictional members, and a disk section configured to connect the innercircumferential cylindrical section and the outer circumferential cylindrical section in a radial direction,
a lubricating liquid discharged from the flow channel is guided to the disk section,
inner-diameter-side through-holes through which a lubricating liquid passes on an inner diameter side of the disk section and outer-diameter-side through-holes through which a lubricating liquid passes on an outer diameter side of the disk section are formed in the disk section, and
the inner-diameter-side through-holes and the outer-diameter-side through-holes are alternately disposed in a circumferential direction of the disk section,
wherein a total area of the inner-diameter-side through-holes is larger than a total area of the outer-diameter-side through-holes,
wherein an outflow port of the flow channel faces the inner-diameter-side through-holes.

2. The lubricating structure of the power transmission apparatus according to claim 1, wherein outermost ends of the inner-diameter-side through-holes in the radial direction are disposed further outside in the radial direction than a position at which a virtual line on which the flow channel extends from the outflow port and the disk section cross each other.

3. The lubricating structure of the power transmission apparatus according to claim 1, wherein the inner-diameter-side through-holes or the outer-diameter-side through-holes have rectangular shapes formed by sides in the radial direction and sides in the circumferential direction.

4. The lubricating structure of the power transmission apparatus according to claim 2, wherein the inner-diameter-side through-holes or the outer-diameter-side through-holes have rectangular shapes formed by sides in the radial direction and sides in the circumferential direction.

5. A power transmission apparatus comprising a rotary shaft and a power transmission element disposed on an outer circumference of the rotary shaft and formed by alternately stacking a plurality of frictional members in an axial direction,
wherein the power transmission element includes an inner circumferential cylindrical section rotated integrally with the rotary shaft, an outer circumferential cylindrical section rotated integrally with the plurality of frictional members, and a disk section configured to connect the inner circumferential cylindrical section and the outer circumferential cylindrical section in a radial direction,
inner-diameter-side through-holes through which a lubricating liquid passes on an inner diameter side of the disk section and outer-diameter-side through-holes through which a lubricating liquid passes on an outer diameter side of the disk section are formed in the disk section, and
the inner-diameter-side through-holes and the outer-diameter-side through-holes are alternately disposed in a circumferential direction of the disk section,
wherein a total area of the inner-diameter-side through-holes is larger than a total area of the outer-diameter-side through-holes,
wherein a flow channel configured to guide a lubricating liquid that performs lubrication of the power transmission apparatus to the disk section is provided, and
an outflow port of the flow channel faces the inner-diameter-side through-holes.

6. The power transmission apparatus according to claim 5, wherein outermost ends of the inner-diameter-side through-holes in the radial direction are disposed further outside in the radial direction than a position at which a virtual line on which the flow channel extends from the outflow port and the disk section cross each other.

7. The power transmission apparatus according to claim 5, wherein the inner-diameter-side through-holes or the outer-diameter-side through-holes have rectangular shapes formed by sides in the radial direction and sides in the circumferential direction.

8. The power transmission apparatus according to claim 6, wherein the inner-diameter-side through-holes or the outer-diameter-side through-holes have rectangular shapes formed by sides in the radial direction and sides in the circumferential direction.

* * * * *